United States Patent
McCullough

(10) Patent No.: US 9,331,978 B2
(45) Date of Patent: *May 3, 2016

(54) METHOD FOR CONTINUOUS, FRAME-SPECIFIC CLICK-STREAM RECORDING

(71) Applicant: Open Text S.A., Luxembourg (LU)

(72) Inventor: Sean M. McCullough, San Francisco, CA (US)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,311

(22) Filed: Apr. 23, 2015

(65) Prior Publication Data

US 2015/0229602 A1    Aug. 13, 2015

Related U.S. Application Data

(63) Continuation of application No. 14/104,324, filed on Dec. 12, 2013, now Pat. No. 9,043,490, which is a continuation of application No. 12/900,078, filed on Oct. 7, 2010, now Pat. No. 8,631,121, which is a (Continued)

(51) Int. Cl.
*H04L 29/06* (2006.01)
*H04L 29/12* (2006.01)
*G06Q 30/02* (2012.01)

(Continued)

(52) U.S. Cl.
CPC ........ *H04L 61/2007* (2013.01); *G06Q 30/0273* (2013.01); *H04L 45/44* (2013.01); *H04L 61/2046* (2013.01); *H04L 67/22* (2013.01); *H04L 67/306* (2013.01)

(58) Field of Classification Search
CPC ....... H04L 45/44; H04L 67/22; H04L 67/306; H04L 12/26; G06Q 30/0273
See application file for complete search history.

(56) References Cited

U.S. PATENT DOCUMENTS

| | | |
|---|---|---|
| 4,754,428 A | 6/1988 | Schultz et al. |
| 4,811,207 A | 3/1989 | Hikita et al. |
| 5,210,824 A | 5/1993 | Putz et al. |

(Continued)

OTHER PUBLICATIONS

Kitts, "An Evaluation of Customer Retention and Revenue Forecasting in the Retail Sector: Investigation into the effects of Seasonality, Spending and Method," Oct. 25, 1999, 63 pgs, DataSage, Inc., Reading, MA.

(Continued)

*Primary Examiner* — Mohammad A Siddiqi
(74) *Attorney, Agent, or Firm* — Sprinkle IP Law Group

(57) ABSTRACT

A method for tracking a user's movements between network addresses can include, subsequent to a request for a (current) network address from a user, receiving the network address and an identifier for a region associated with the network address. The method can also include locating a record that contains the identifier for the region and a time that immediately precedes the request for the network address from the user. The record may further contain a prior network address. The method can further include generating an entry for a table that includes the identifier for the region, the current network address, and the prior network address. A server computer or a client computer can generate the entry. Improved accountability and improved user profile accuracy can be obtained with the method. A data processing system readable medium can comprise code that includes instructions for carrying out the method.

20 Claims, 5 Drawing Sheets

Related U.S. Application Data continuation of application No. 11/601,357, filed on Nov. 17, 2006, now Pat. No. 7,860,969, which is a continuation of application No. 09/681,758, filed on May 31, 2001, now Pat. No. 7,155,506.

(60) Provisional application No. 60/208,889, filed on Jun. 2, 2000, provisional application No. 60/208,890, filed on Jun. 2, 2000.

(51) Int. Cl.
*H04L 29/08* (2006.01)
*H04L 12/721* (2013.01)

(56) References Cited

U.S. PATENT DOCUMENTS

| | | | |
|---|---|---|---|
| 5,212,787 A | 5/1993 | Baker et al. | |
| 5,226,161 A | 7/1993 | Khoyi et al. | |
| 5,257,369 A | 10/1993 | Skeen et al. | |
| 5,331,673 A | 7/1994 | Elko et al. | |
| 5,339,392 A | 8/1994 | Risberg et al. | |
| 5,421,015 A | 5/1995 | Khoyi et al. | |
| 5,572,643 A | 11/1996 | Judson | |
| 5,704,017 A | 12/1997 | Heckerman et al. | |
| 5,727,129 A | 3/1998 | Barrett et al. | |
| 5,732,218 A | 3/1998 | Bland et al. | |
| 5,740,430 A | 4/1998 | Rosenberg et al. | |
| 5,761,416 A | 6/1998 | Mandal et al. | |
| 5,774,660 A | 6/1998 | Brendel et al. | |
| 5,790,426 A | 8/1998 | Robinson | |
| 5,790,790 A | 8/1998 | Smith et al. | |
| 5,796,952 A | 8/1998 | Davis et al. | |
| 5,870,559 A | 2/1999 | Leshem et al. | |
| 5,878,223 A | 3/1999 | Becker et al. | |
| 5,884,282 A | 3/1999 | Robinson | |
| 5,918,014 A | 6/1999 | Robinson | |
| 5,958,008 A | 9/1999 | Pogrebisky et al. | |
| 5,991,735 A | 11/1999 | Gerace | |
| 6,012,052 A | 1/2000 | Altschuler et al. | |
| 6,035,332 A | 3/2000 | Ingrassia et al. | |
| 6,041,311 A | 3/2000 | Chislenko et al. | |
| 6,049,777 A | 4/2000 | Sheena et al. | |
| 6,067,565 A | 5/2000 | Horvitz | |
| 6,085,226 A | 7/2000 | Horvitz | |
| 6,092,049 A | 7/2000 | Chislenko et al. | |
| 6,094,662 A | 7/2000 | Hawes | |
| 6,112,279 A | 8/2000 | Wang | |
| 6,128,665 A | 10/2000 | Fields et al. | |
| 6,138,141 A | 10/2000 | DeSimone et al. | |
| 6,141,737 A | 10/2000 | Krantz et al. | |
| 6,151,622 A | 11/2000 | Fraenkel et al. | |
| 6,185,586 B1 | 2/2001 | Judson | |
| 6,185,608 B1 | 2/2001 | Hon et al. | |
| 6,393,479 B1 | 5/2002 | Glommen | |
| 6,567,843 B1 * | 5/2003 | Schumacher | 709/203 |
| 6,741,967 B1 | 5/2004 | Wu et al. | |
| 6,810,414 B1 | 10/2004 | Brittain | |
| 6,941,552 B1 * | 9/2005 | Beadle et al. | 718/1 |
| 6,996,612 B1 | 2/2006 | McCullough | |
| 7,155,506 B1 | 12/2006 | McCullough | |
| 7,251,687 B1 | 7/2007 | McCullough | |
| 7,502,994 B2 | 3/2009 | Kocol | |
| 7,672,879 B1 | 3/2010 | Kumar et al. | |
| 7,827,274 B1 | 11/2010 | McCullough | |
| 7,860,969 B2 | 12/2010 | McCullough | |
| 8,341,019 B2 | 12/2012 | McCullough | |
| 8,631,121 B2 | 1/2014 | McCullough | |
| 9,043,490 B2 | 5/2015 | McCullough | |
| 9,087,350 B2 * | 7/2015 | McCullough | |
| 2002/0013834 A1 | 1/2002 | Esakov et al. | |
| 2002/0062252 A1 | 5/2002 | Van Zoest et al. | |
| 2002/0152237 A1 | 10/2002 | Cohen et al. | |
| 2009/0172159 A1 | 7/2009 | Kocol | |
| 2011/0026431 A1 | 2/2011 | McCullough | |
| 2014/0101334 A1 | 4/2014 | McCullough | |

OTHER PUBLICATIONS

Kitts, "RMS Revenue and Retention Forecasting Final Phase Model Specification," Jan. 31, 2000, 16 pgs., DataSage, Inc., Reading, MA.
"Datasage Customer Analyst," 1998, 11 pgs., DataSage, Inc., Reading, MA.
Montgomery, A.L. and Rossi, P.E., "Estimating Price Elasticities with Theory-Based Priors," Journal of Marketing Research, Nov. 1999, pp. 413-423, vol. 36.
Simon, Herrmann, "Price Management," 1989, 32 pgs., Elsevier Sci Publishing, The Netherlands.
Subrahmanyan, S. and Shoemaker, R., "Developing Optimal Pricing and Inventory Policies for Retailers Who Face Uncertain Demand," Journal of Retailing, 1996, pp. 7-30, vol. 72, No. 1, New York Univ., New York, NY.
Vilcassim, N.J. and Chintagunta, P.K., "Investigating Retailer Product Category Pricing from Household Scanner Panel Data," Journal of Retailing, 1995, pp. 103-128, vol. 71, No. 2, New York Univ., NY, NY.
Weinstein, Steve, "Tackling Technology," Progressive Grocer, Feb. 1999, Bill Communications, Inc., 6 pgs.
Wellman, David, "Down in the (Data) Mines," Supermarket Business, May 1999, pp. 33-35.
RT News, "New Customer Management System Returns Lost Sales to Dick's," RT Magazine, Jun. 1999, Bill Communications, Inc., 1 pg.
"DataSage Customer Analyst," 1999, 2 pgs., DataSage, Inc., Reading, MA.
Miller, M., "Applications Integration-Getting It Together," PC Magazine, Feb. 8, 1994, 10 pgs.
PointCast 2.0 Eases Burden on Network, Jun. 2, 1997, 3 pgs., PC Week, Abstract, ZDNet.
Strom, David, The Best of Push, Apr. 1997, 6 pgs.
When Shove Comes to Push, Feb. 10, 1997, 5 pgs, PC Week, V. 14, Abstract, ZDNet.
thirdvoice.com—Home Page and Frequently Asked Questions (7 pgs.), www.thirdvoice.com, www.thirdvoice.com/help.20/faq.htm, printed on Dec. 28, 2000, thirdvoice, Inc.
Office Action issued in U.S. Appl. No. 09/681,758, mailed May 31, 2001, 11 pgs.
Office Action issued in U.S. Appl. No. 09/681,758, mailed Sep. 2, 2004, 15 pgs.
Office Action issued in U.S. Appl. No. 09/681,758, mailed Jan. 6, 2005, 20 pgs.
Office Action issued in U.S. Appl. No. 09/681,758, mailed Jul. 19, 2005, 19 pgs.
Office Action issued in U.S. Appl. No. 09/681,758, mailed Jan. 9, 2006, 22 pgs.
Office Action issued in U.S. Appl. No. 11/601,357, mailed Sep. 25, 2009, 15 pgs.
Office Action for U.S. Appl. No. 12/900,078, mailed Dec. 17, 2012, 34 pgs.
Office Action for U.S. Appl. No. 12/900,078, mailed May 22, 2013, 14 pgs.
Office Action for U.S. Appl. No. 14/104,324, mailed Jul. 3, 2014, 7 pgs.
Notice of Allowance for U.S. Appl. No. 14/104,324, mailed Jan. 22, 2015, 6 pgs.

* cited by examiner

METHOD FOR CONTINUOUS, FRAME-SPECIFIC CLICK-STREAM RECORDING

CROSS-REFERENCE TO RELATED APPLICATIONS

This is a continuation application of U.S. patent application Ser. No. 14/104,324, filed Dec. 12, 2013, entitled "METHOD FOR CONTINUOUS, FRAME-SPECIFIC CLICK-STREAM RECORDING," which is a continuation application of U.S. patent application Ser. No. 12/900,078, filed Oct. 7, 2010, now U.S. Pat. No. 8,631,121, entitled "METHOD FOR CONTINUOUS, FRAME-SPECIFIC CLICK-STREAM RECORDING," which is a continuation application of U.S. patent application Ser. No. 11/601,357, filed Nov. 17, 2006, now U.S. Pat. No. 7,860,969, entitled "METHOD FOR CONTINUOUS, FRAME-SPECIFIC CLICK-STREAM RECORDING," which is a continuation of U.S. patent application Ser. No. 09/681,758, filed May 31, 2001, now U.S. Pat. No. 7,155,506, entitled "METHOD FOR CONTINUOUS, FRAME-SPECIFIC CLICK-STREAM RECORDING," which claims a benefit of priority from U.S. Provisional Application No. 60/208,890, filed Jun. 2, 2000, entitled "METHOD FOR CONTINUOUS, FRAME SPECIFIC CLICK-STREAM RECORDING" and No. 60/208,889, filed Jun. 2, 2000, entitled "METHOD FOR CLICK-STREAM ANALYSIS USING WEB DIRECTORY REVERSE CATEGORIZATION." This application also relates to U.S. patent application Ser. No. 09/681,760, filed May 31, 2001, now U.S. Pat. No. 7,251,687, entitled "METHOD FOR CLICK-STREAM ANALYSIS USING WEB DIRECTORY REVERSE CATEGORIZATION," U.S. patent application Ser. No. 11/729,530, filed Mar. 29, 2007, now U.S. Pat. No. 7,827,274, entitled "METHOD FOR CLICK-STREAM ANALYSIS USING WEB DIRECTORY REVERSE CATEGORIZATION," U.S. patent application Ser. No. 12/905,898, filed Oct. 15, 2010, now U.S. Pat. No. 8,341,019, entitled "METHOD FOR CLICK-STREAM ANALYSIS USING WEB DIRECTORY REVERSE CATEGORIZATION," and U.S. patent application Ser. No. 13/708,766, filed Dec. 7, 2012, entitled "METHOD FOR CLICK-STREAM ANALYSIS USING WEB DIRECTORY REVERSE CATEGORIZATION". All applications listed in this paragraph are fully incorporated herein by reference.

FIELD OF THE INVENTION

This invention relates in general to methods and data processing system readable media, and more particularly, to methods of tracking movement between network addresses and data processing system readable media for carrying out those methods.

DESCRIPTION OF THE RELATED ART

Internet Service Providers ("ISPs") and others may track Uniform Resource Locators (URLs) from a user by creating a table including a user identifier, the requested URL, and a timestamp. This method of recording can give a chronological sequence of URLs for the user. A problem with this chronological listing is that it may not accurately show the URL from which the user requested the current URL. This can be important where compensation between parties depends on the originating (source) URL and the current (destination) URL. Because an accurate listing all of this movement may not be possible, the parties may dispute how much money, if any, one company owes the other company. An accurate list may be needed for other purposes, such as creating user profiles and the like.

SUMMARY OF THE INVENTION

A data processing system-implemented method can be used to better track a user's movements between network addresses. A frame identifier can be used to help track the movements. A table can be generated that may include entries comprising a frame identifier, current network address, prior network address, time, and potentially other information. The improved accuracy of the movements allows better accountability between companies for financial arrangements regarding links to each other's network sites and allows for more accurate user profiles to be created.

In one set of embodiments, a data processing system-implemented method of tracking movement between network addresses can comprise receiving a first frame identifier and a first network address at a first time. The method can also comprise finding a record including the first frame identifier, a second network address, and a second time. The second time may precede the first time. The method can further comprise generating an entry for a table that includes the first frame identifier, the first network address, the second network address, and a third time.

In another set of embodiments, a data processing system-implemented method of tracking movement between network addresses can comprise displaying a first view to a user. The first view may include a first frame having a first frame identifier and a second frame having a second frame identifier. The method can also comprise receiving a first request for a first network address from the user. The first request can be generated by the user activating a first object within the first frame. The method can further comprise sending the first frame identifier and the first network address at a first time. The method can yet further comprise finding a record including the first frame identifier, a second network address, and a second time. For the first frame identifier, the second time may precede the first time. The method can still further comprise generating a first entry for a table that includes the first frame identifier, the first network address, the second network address, and a third time.

In still other embodiments, a data processing system readable medium can have code embodied within it. The code can include instructions executable by a data processing system. The instructions may be configured to cause the data processing system to perform the methods described herein.

The foregoing general description and the following detailed description are exemplary and explanatory only are not restrictive of the invention, as claimed.

BRIEF DESCRIPTION OF THE DRAWINGS

The invention is illustrated by way of example and not limitation in the accompanying figures, in which like references indicate the same elements, and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A data processing system-implemented method can be used to better track a user's movements between network addresses. The method can comprise sending a frame identifier ("ID") and a requested (current) network address at a first time. The method can also comprise finding a record including the frame identifier that has a prior network address and a time prior to the current time. The method can further comprise generating an entry for a table that includes the frame identifier, the current network address, the prior network address, and time. Improved accountability and improved user profile accuracy may be obtained with the method. A data processing system readable medium can comprise code that includes instructions for carrying out the method.

A few terms are defined or clarified to aid in understanding the descriptions that follow. A network includes an interconnected set of server and client computers over a publicly available medium (e.g., the internet) or over an internal (company-owned) system. A user at a client computer may gain access to the network using a network access provider. An Internet Service Provider ("ISP") is a common type of network access provider. A network address includes information that can be used by a server computer to locate information, whether internal to that server computer or at a different, remote computer or database. URLs are examples of network addresses. A network site corresponds to a location specified by a network address. A web site is a common type of network site and can comprise one or more web pages. Note that the examples given within this paragraph are for purposes of illustration and not limitation. Regarding ownership and control, a first party significantly owns or controls a second party or property if the second party is an employee of the first party or if the first party owns or controls (as determined by the voting percentage or number of voting shares) at least 20 percent of the second party or property.

Figure 1:
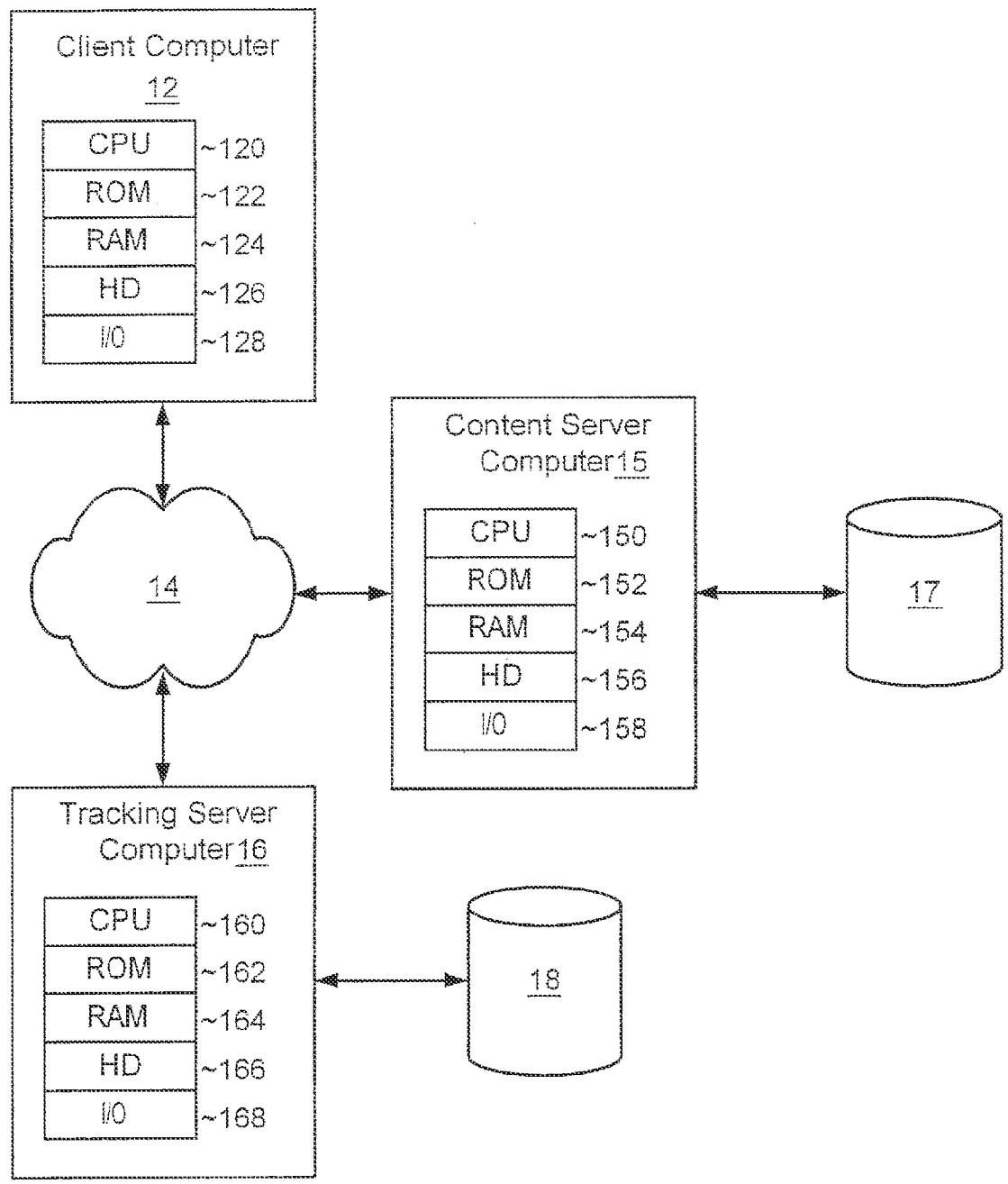
FIG. 1 includes an illustration of a hardware architecture for carrying out methods of tracking movement between network addresses.

Before discussing details of embodiments of the invention, a hardware architecture for using embodiments is described. FIG. 1 illustrates an exemplary architecture and includes a client computer 12 that is bi-directionally coupled to a network 14, and a tracking server computer 16 that is bi-directionally coupled to the network 14 and database 18. A content server computer 15 is bi-directionally coupled to the network 14 and database 17. The client computer 12 includes a central processing unit ("CPU") 120, a read-only memory ("ROM") 122, a random access memory ("RAM") 124, a hard drive ("HD") or storage memory 126, and input/output device(s) ("I/O") 128. The I/O devices 128 can include a keyboard, monitor, printer, electronic pointing device (e.g., mouse, trackball, etc.), or the like. The content server computer 15 can include a CPU 150, ROM 152, RAM 154, HD 156, and I/O 158, and the tracking server computer 16 can include a CPU 160, ROM 162, RAM 164, HD 166, and I/O 168.

Each of the client computer 12 and the server computers 15 and 16 is an example of a data processing system. ROM 122, 152, and 162, RAM 124, 154, and 164, HD 126, 156, and 166, and the databases 17 and 18 include media that can be read by the CPU 120, 150, or 160. Therefore, each of these types of memories includes a data processing system readable medium. These memories may be internal or external to the computers 12, 15, and 16.

Figure 2:
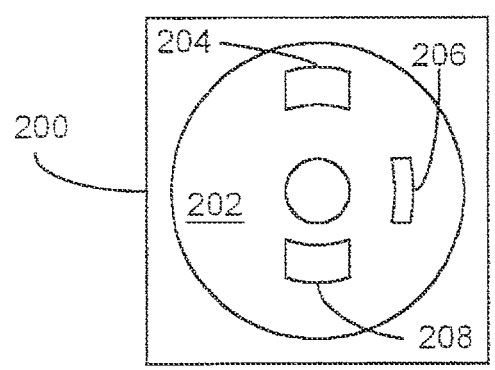
FIG. 2 includes an illustration of a data processing system readable medium including software code.

The methods described herein may be implemented in suitable software code that may reside within ROM 122, 152, or 162, RAM 124, 154, or 164, or HD 126, 156, or 166. FIG. 2 illustrates a combination of software code elements 204, 206, and 208 that are embodied within a data processing system readable medium 202 on storage device 200, such as a hard drive. In addition to those types of memories previously described, the instructions in an embodiment may be contained on a data storage device with a different data processing system readable storage medium. The instructions may be stored as software code elements on a DASD array, magnetic tape, floppy diskette, electronic read-only memory, optical storage device, CD ROM or other appropriate data processing system readable medium or storage device.

Figure 3A:
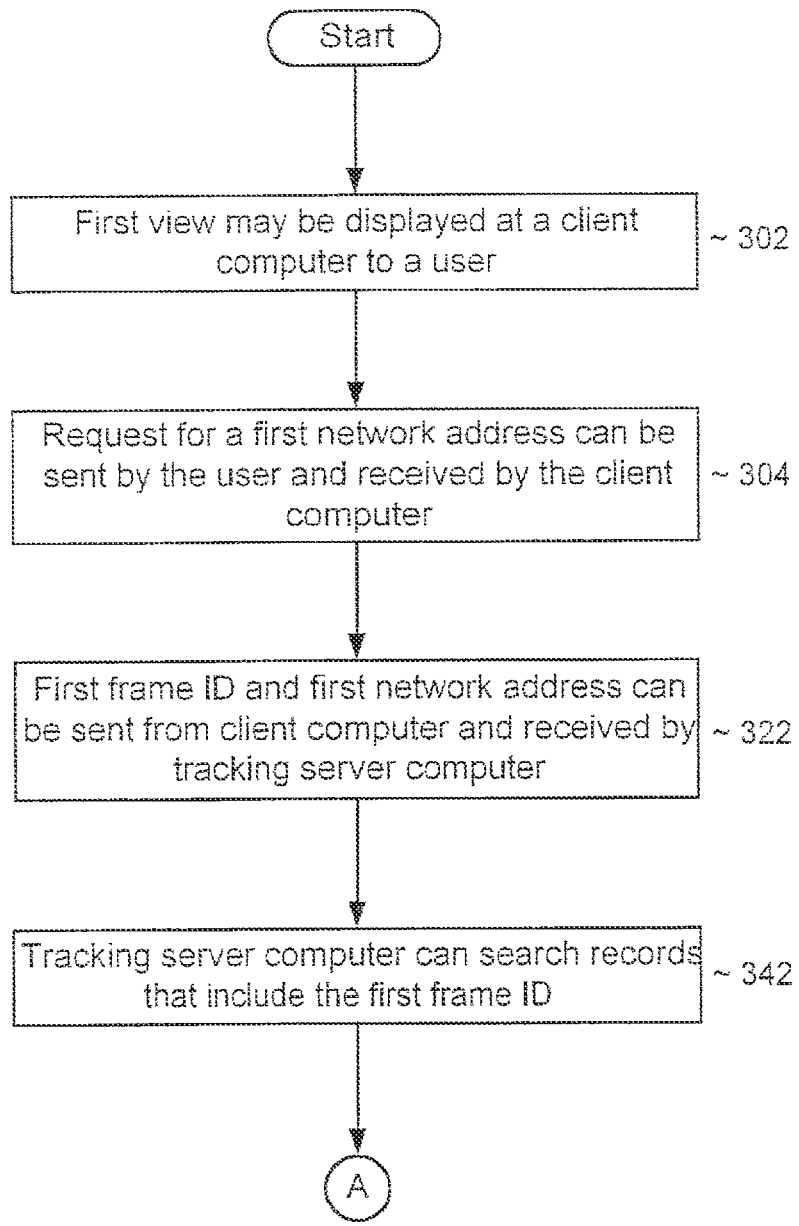
FIGS. 3A and 3B include a process flow diagram illustrating a method of tracking movement between network addresses.
Figure 3B:
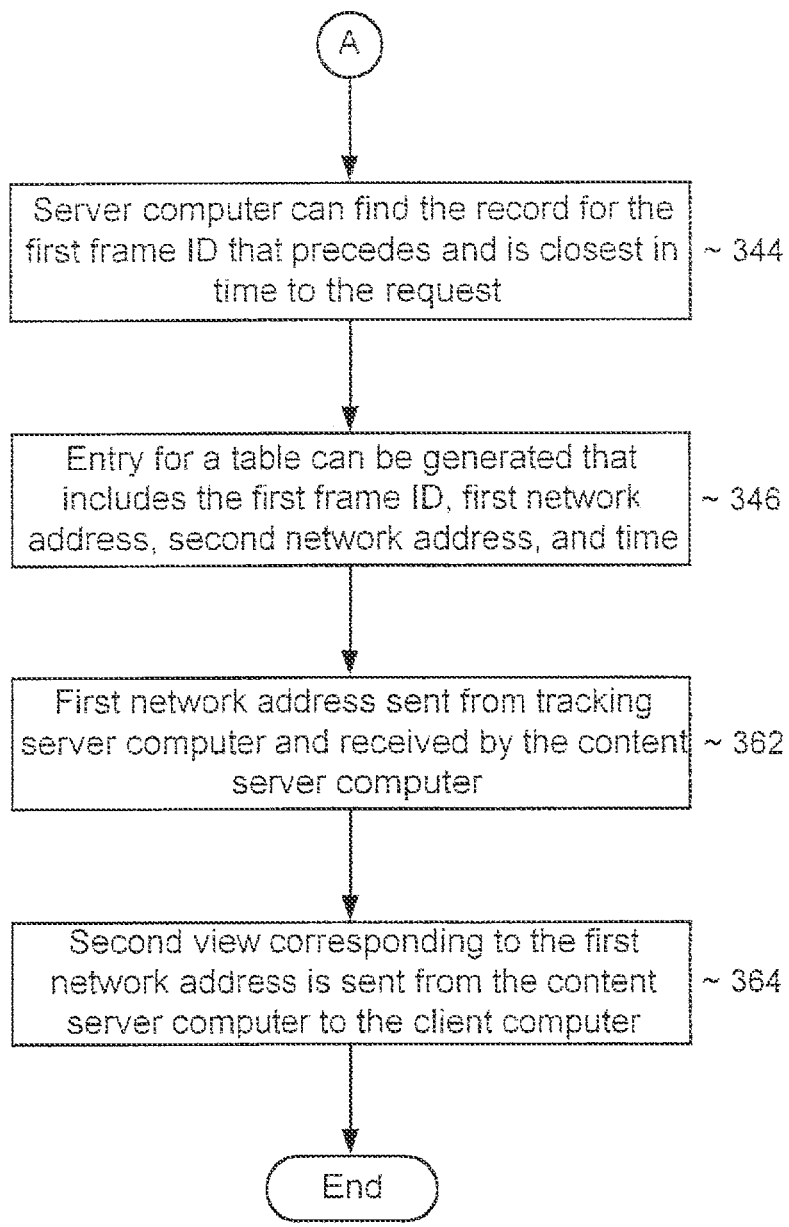

In an illustrative embodiment of the invention, the computer-executable instructions may be lines of compiled $C^{++}$, Java, or other language code. Other architectures may be used. For example, the functions of the client computer 12 may be incorporated into the tracking server computer 16, and vice versa. Likewise, the functions of the tracking server computer 16 may be incorporated into the content server computer 15, and vice versa. More or fewer server computers can be used. FIGS. 3A and 3B include an illustration, in the form of a flow diagram, of the structure of such a software program.

Communications between the client computer 12 and the server computers 15 and 16 can be accomplished using radio frequency, electronic, or optical signals. When a user (human) is at the client computer 12, the client computer 12 may convert the signals to a human understandable form when sending a communication to the user and may convert input from the user to appropriate signals to be used by the client computer 12 or the server computers 15 or 16.

Figure 4:
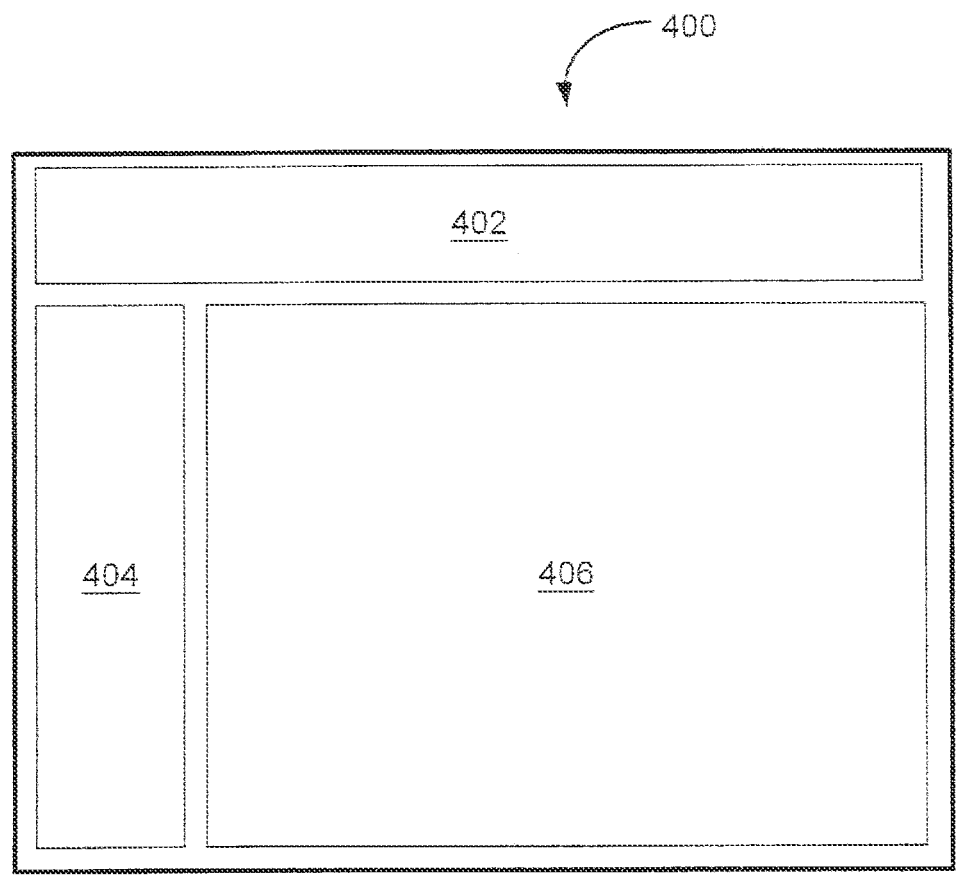
FIG. 4 includes an illustration of a view with frames displayed to a user.

Attention is now directed to a method for tracking movement between network addresses as illustrated in FIGS. 3A and 3B. A first view may be displayed at the client computer 12 to a user as illustrated in block 302 of FIG. 3A. For example, the user may see view 400 as shown in FIG. 4. View 400 may include a browser control section 402, a first frame 404, and a second frame 406. The browser control section 402 can include icons and pull-down menus to allow a user to move forward, backward, home, adjust preferences, or perform other functions with the browser. The first frame 404 may include a navigation bar or a set of advertisements, and the second frame 406 can include a body of the view 400. The first frame 404 and the second frame 406 may include icons, hyperlinks, or other similar objects that can be activated by the user to go from a current network address to a different network address. As shown in FIG. 4, the first frame 404 may have one network address, the second frame 406 may have another network address, and the composite view 400 may include yet another network address.

As previously stated, the route used by a user to reach a network address may have financial implications. The user may be able to access a network address from each of the first frame 404 and the second frame 406. In one example, assume that the first frame 404 has advertisements for products or services of one company ("advertising company"), and the second frame 406 represents the information from a company that controls the content server computer 15 ("content company"). If the user accesses a network address using a link or other object within second frame 406, the advertising company may not owe any money to the content company. However, if the user accesses a network address using frame 404, the advertising company may owe fee to the content company. Therefore, identifying the frame and sequence of network addresses using that frame may have financial implications. Clearly, other business arrangements are possible.

A request for a first network address from a first frame 404 can be sent from the user and received by the client computer 12 as shown in block 304 in FIG. 3A. The request can be made when the user (at client computer 12) activates an icon, a link, or other similar object within the first frame 404 by use of an electronic pointing device, such as a mouse, a trackball, or the like. A signal, which may include a first frame ID for the first frame 404 and the first network address can be sent from the client computer 12 and received by the tracking server computer 16 (block 322) via network 14.

The tracking server computer 16 can search records that include the first frame identifier (block 342). In one embodiment, the records can reside within a table in database 18. The records may be organized in rows and columns. The rows may correspond to each instance of a network address request. The columns may correspond to different fields including frame identifier, prior (originating or source) network address, current (destination) network address, time (e.g., timestamp or other temporal information), and the like. Optionally, a user identifier may be included as a field.

After locating the records for the same frame identifier, the tracking server computer 16 can find the record that immediately precedes (before and closest in time to) the request (block 344 in FIG. 3B). The tracking server computer 16 can generate an entry for the table that may include the first frame identifier (for frame 404), the first (current) network address that corresponds to the request, the immediately preceding (second) network address for that same frame identifier, and a timestamp or other temporal information (block 346). The timestamp or other temporal information may be substantially the same time at which the signal is sent from the client computer 12 to the tracking server computer 16 regarding the request. Usually, the time difference between the timestamp and the time the client computer 12 sends the first frame ID and first network address to the server computer 16 is no more than one minute. In this manner, a table is created that includes the current and prior network addresses to more accurately track the movement of the user from one network address to another network address for a specific frame identifier.

The first network address can be sent from the tracking server computer 16 to the content server computer 15 as shown in block 362. This may be performed at the same time or just before or after the actions in blocks 322, 342, 344, and 346 are performed. The content server computer 15 may access database 17 to obtain information related to the first network address.

A second view (not shown) corresponding to the first network address can be sent from the content server computer 15 over network 14 to the client computer 12. The view may be displayed on the I/O 128 at client computer 12 for the user to see or print. The time for performing the acts within the method can be performed relatively quickly. Therefore, the method may be transparent to the user because he or she may see little time lapse between requesting a network address and seeing the corresponding view for that network address.

The method may continue with the user requesting to be sent back to view 400. In this instance, the user may be re-displayed view 400. The user may decide to originate a request for a network address from frame 406 (second frame) instead of from frame 404. The method can proceed in a similar manner as the request that was made from frame 404. The user would make a request for a new network address from frame 406. The client computer 12 can send a signal to the tracking server computer 16 via the network 14 that would include the frame identifier for frame 406 and the network address being requested from frame 406. The tracking server computer 16 can find the immediately preceding record with that same frame identifier. An entry in a table can be generated by server computer 16 including the second frame identifier for frame 406, the current network address, the prior network address, and a different timestamp compared to the timestamp for the first frame identifier request. The second network address may be sent from the tracking computer 16 and received by the content server computer 15. The content server computer 15 may send and the client computer 12 may receive a view corresponding to the network address as requested from frame 406 for the user at client computer 12 to see or print.

Figure 5:
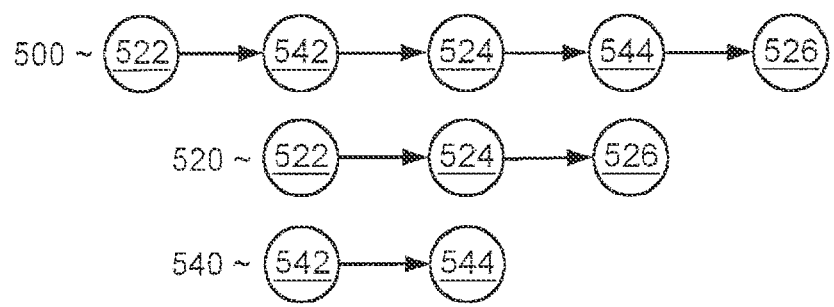
FIG. 5 includes an illustration of a node diagram shown a sequence of network addresses accessed by the user.

After data in the table has been collected, a node diagram can be created that tracks the movement of the user at one frame when moving from one network address to another. FIG. 5 includes node diagrams to better illustrate the movement within frames. String 500 includes of chronological node diagram for the user at client computer 12. Each node represents a network address. As can be seen, the user requested network address 522 first, network address 542 second, network address 524 third, network address 544 fourth, and network address 526 fifth. From this diagram, one may conclude that the user went from network address 522 to network address 542, but this may not be the case.

String 520 may illustrate a sequence of network addresses that originated from frame 404 but not frame 406, and string 540 may illustrate a sequence of network addresses that originated from frame 406 but not frame 404. Because the user may switch between frames, the order in string 500 does not represent the manner in which the user went from network address to network address for a specific frame. As shown in string 520, the user may have accessed network address 524 directly from network address 522 as shown in string 520, and not from network address 542 as shown in string 500. Similarly, the user may have accessed network address 544 directly from network address 542 as shown in string 540, and not from network address 524 as shown in string 500. Clearly, strings 520 and 540 more accurately reflect the movement of the user between network addresses from specific frames. When financial arrangements or a user profile depend on this tracking information, the accurate tracking movement between network addresses is needed. Activity statements can be generated that indicate that a sequence of network addresses was activated from the various frames.

The method works substantially the same if the user has more than one copy of a browser application open at client computer 12. Each copy may have its own frame identifier, as generated by client computer 12. Instead of having different frames (404 and 406) in a single window, the frames are in different windows.

While much of the discussion has focused on the tracking server computer 16, at least a portion of the method may alternatively be performed by the client computer 12 in assembling information for the table. For example, a table may reside within HD 126 of client computer 12. The client computer 12 may create the table with the frame identifier, current network address, prior network address, and timestamp. The information within the table on client computer 12 may be downloaded to a larger table within the database 18 via tracking server computer 16 or other location external to client computer 12 on a periodic or other basis.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   subsequent to a request for a first network address from a user at a first computer, a second computer receiving from the first computer the first network address and a first identifier for a first region, the first computer displaying a first view to the user, the first view including the first region of a web page, the web page controlled by a first party, the first region associated with a second party, the first region associated with the first network address, the web page having a second network address;
   the second computer locating a record that contains the first identifier for the first region and a time that immediately precedes the request for the first network address from the user, the record residing within a table in a database and further containing a third network address; and
   the second computer generating an entry in the table that includes the first identifier for the first region, the first network address from the first computer, and the third network address contained in the record to thereby track movement of the user with respect to the first region of the web page.

2. The method according to claim 1, wherein the second computer comprises a content server, and wherein the content server accesses a database to obtain information related to the first network address, generates the first view, and provides the first view to the first computer.

3. The method according to claim 1, wherein the second computer comprises a tracking server, wherein the tracking server sends the first network address to a content server, and wherein the content server accesses a database to obtain information related to the first network address, generates the first view, and provides the first view to the first computer.

4. The method according to claim 1, further comprising:
   generating, by the second computer based on data in the table, a node diagram for tracking the movement of the user with respect to the first region of the web page when the user moves from one network address to another.

5. The method according to claim 1, wherein the second computer uses data in the table that includes the first identifier for the first region, the first network address from the first computer, and the third network address contained in the record to track movement of the user with respect to the first region of the web page relative to a second region of the web page.

6. The method according to claim 1, wherein the second computer uses data in the table that includes the first identifier for the first region, the first network address from the first computer, and the third network address contained in the record to track movement of the user with respect to the first region of the web page relative to a second region of a different web page.

7. The method according to claim 1, wherein the second computer uses data in the table that includes the first identifier for the first region, the first network address from the first computer, and the third network address contained in the record to track movement of the user with respect to the first region of the web page of a first browser application relative to a second region of a web page of a second browser application.

8. A system, comprising:
   at least one server machine having a processor, non-transitory computer memory, and stored instructions translatable by the processor to perform:
      subsequent to a request for a first network address from a user at a first computer, receiving from the first computer the first network address and a first identifier for a first region, the first computer displaying a first view to the user, the first view including the first region of a web page, the web page controlled by a first party, the first region associated with a second party, the first region associated with the first network address, the web page having a second network address;
      locating a record that contains the first identifier for the first region and a time that immediately precedes the request for the first network address from the user, the record residing within a table in a database and further containing a third network address; and
      generating an entry in the table that includes the first identifier for the first region, the first network address from the first computer, and the third network address contained in the record to thereby track movement of the user with respect to the first region of the web page.

9. The system of claim 8, wherein the at least one server machine comprises a content server, and wherein the content server accesses a database to obtain information related to the first network address, generates the first view, and provides the first view to the first computer.

10. The system of claim 8, wherein the at least one server machine comprises a tracking server, wherein the tracking server sends the first network address to a content server, and wherein the content server accesses a database to obtain information related to the first network address, generates the first view, and provides the first view to the first computer.

11. The system of claim 8, wherein the stored instructions are further translatable by the processor to perform:
    generating, based on data in the table, a node diagram for tracking the movement of the user with respect to the first region of the web page when the user moves from one network address to another.

12. The system of claim 8, wherein the stored instructions are further translatable by the processor to use data in the table that includes the first identifier for the first region, the first network address from the first computer, and the third network address contained in the record to track movement of the user with respect to the first region of the web page relative to a second region of the web page.

13. The system of claim 8, wherein the stored instructions are further translatable by the processor to use data in the table that includes the first identifier for the first region, the first network address from the first computer, and the third network address contained in the record to track movement of the user with respect to the first region of the web page relative to a second region of a different web page.

14. The system of claim 8, wherein the stored instructions are further translatable by the processor to use data in the table that includes the first identifier for the first region, the first network address from the first computer, and the third network address contained in the record to track movement of the user with respect to the first region of the web page of a first browser application relative to a second region of a web page of a second browser application.

15. A computer program product having at least one non-transitory computer readable medium storing instructions translatable by at least one processor to perform:
- subsequent to a request for a first network address from a user at a first computer, receiving from the first computer the first network address and a first identifier for a first region, the first computer displaying a first view to the user, the first view including the first region of a web page, the web page controlled by a first party, the first region associated with a second party, the first region associated with the first network address, the web page having a second network address;
- locating a record that contains the first identifier for the first region and a time that immediately precedes the request for the first network address from the user, the record residing within a table in a database and further containing a third network address; and
- generating an entry in the table that includes the first identifier for the first region, the first network address from the first computer, and the third network address contained in the record to thereby track movement of the user with respect to the first region of the web page.

16. The computer program product of claim 15, wherein the instructions are further translatable by the at least one processor to perform:
- accessing a database to obtain information related to the first network address;
- generating the first view; and
- providing the first view to the first computer.

17. The computer program product of claim 15, wherein the instructions are further translatable by the at least one processor to perform:
- sending the first network address to a content server, wherein the content server accesses a database to obtain information related to the first network address, generates the first view, and provides the first view to the first computer.

18. The computer program product of claim 15, wherein the instructions are further translatable by the at least one processor to perform:
- generating, based on data in the table, a node diagram for tracking the movement of the user with respect to the first region of the web page when the user moves from one network address to another.

19. The computer program product of claim 15, wherein the instructions are further translatable by the at least one processor to use data in the table that includes the first identifier for the first region, the first network address from the first computer, and the third network address contained in the record to track movement of the user with respect to the first region of the web page relative to a second region of the web page or of a different web page.

20. The computer program product of claim 15, wherein the instructions are further translatable by the at least one processor to use data in the table that includes the first identifier for the first region, the first network address from the first computer, and the third network address contained in the record to track movement of the user with respect to the first region of the web page of a first browser application relative to a second region of a web page of a second browser application.

* * * * *